United States Patent [19]

Kashida et al.

[11] Patent Number: 4,895,761

[45] Date of Patent: Jan. 23, 1990

[54] SHEETS WITH SILICONE-BASED SURFACE-RELEASE FILM

[75] Inventors: Meguru Kashida; Yasuaki Hara, both of Gunma, Japan

[73] Assignee: Shin Etsu Chemical Co., Ltd., Tokyo, Japan

[21] Appl. No.: 239,496

[22] Filed: Sep. 1, 1988

[30] Foreign Application Priority Data

Sep. 2, 1987 [JP] Japan ................... 62-219748

[51] Int. Cl.$^4$ ................................ B32B 9/06
[52] U.S. Cl. ...................... 428/336; 428/340; 428/411.1; 428/447; 428/448; 428/704; 428/452
[58] Field of Search ............... 428/447, 448, 452, 336, 428/340, 441.1, 704

[56] References Cited

U.S. PATENT DOCUMENTS

| | | | |
|---|---|---|---|
| 4,190,688 | 2/1980 | Traver | 525/478 |
| 4,208,504 | 6/1980 | Hockemeyer | 525/478 |
| 4,499,151 | 2/1985 | Dowbenko | 428/450 |
| 4,684,557 | 8/1987 | Pennace | 428/447 |
| 4,719,142 | 1/1988 | Modic | 428/447 |

*Primary Examiner*—Ellis P. Robinson
*Assistant Examiner*—Amy Hulina
*Attorney, Agent, or Firm*—Millen, White & Zelano

[57] ABSTRACT

The invention provides a method for improving the stability of the surface-releasing performance of a silicone-coated release paper so as to minimize the changes in the peeling resistance between the release paper and an adhesive surface bonded thereto even after lapse of time from preparation of the release paper to bonding of the adhesive surface or from bonding of the adhesive surface to peeling thereof. The method comprises providing an overcoating layer of an organotin compound such as dibutyl tin diacetate on the surface of a cured coating layer of an organopolysiloxane composition comprising a vinyl-containing organopolysiloxane, an organohydrogenpolysiloxane and a platinum catalyst to promote the addition reaction between the silicon-bonded vinyl groups and the silicon-bonded hydrogen atoms.

12 Claims, No Drawings

SHEETS WITH SILICONE-BASED SURFACE-RELEASE FILM

BACKGROUND OF THE INVENTION

The present invention relates to substrates having a surface-release film of silicone on surface thereof. More particularly, the invention relates to substrates having a surface-release film of silicone having improved releasability stability.

As is well known, surface-release papers or sheets are used for temporarily protecting adhesive surfaces coated, for example, with a pressure-sensitive adhesive from inadvertent sticking, the release paper being peeled off before the adhesive material is put to actual use. The most widely used releasing agents are those formulated with a silicone because of their high effectiveness and reliability with respect to surface-releasing performance as compared with other types of releasing agents.

Several types of silicone, i.e., organopolysiloxane, compositions are used for the a purpose of forming a silicone-based surface-release film including those utilizing the addition reaction between an organopolysiloxane having aliphatically unsaturated hydrocarbon groups, e.g., vinyl groups, bonded to the silicon atoms and an organohydrogenpolysiloxane having hydrogen atoms directly bonded to the silicon atoms, in the presence of a platinum catalyst, and those utilizing the silanolic condensation reaction between silanolic hydroxy groups formed by the hydrolysis of alkoxy groups bonded to the silicon atoms of an organopolysiloxane in the presence of a condensation catalyst.

One of the important problems in the art described above involved in using an organopolysiloxane composition of either type is the instability of the releasability of the thus-formed surface-release film of silicone in the lapse of time. This problem manifests itself in two ways. For example, the peeling resistance of an adhesive sheet from the silicone-coated release paper gradually decreases during the period of time between the formation of the surface film of silicone and when an adhesive sheet is applied and bonded to the silicone-coated surface. The peeling resistance of an adhesive sheet applied and bonded to the silicone-coated release paper also gradually increases, on the other hand, when the adhesive sheet is bonded to the silicone-coated release paper over a prolonged period of time, due to loss of the releasability of the silicone film over the lapse of time. This problem of the releasability instability of the surface-release film of silicone is particularly serious when the pressure-sensitive adhesive is of the type formulated with an acrylic resin or when the coating amount of the silicone release composition is small on the release paper.

This problem due to the instability of the releasability of silicone in the lapse of time is also serious when the surface film of the silicone composition has been cured not to a full extent, for example, due to an unduly low curing temperature or unduly short time taken for curing. Although a silicone composition can be cured to any desired full extent by increasing the curing temperature or by extending the curing time, such a measure is of course not practical with respect to energy saving and productivity of the coating works, as well as with respect to the limitations of the substrate material, such as paper, to withstand the curing conditions. Moreover, the problem can be solved usually only incompletely even by an increase in the curing temperature or extension of the curing time. Accordingly, it is eagerly desired to develop a method or material with which the above-mentioned problems can be solved completely.

OBJECTS OF THE INVENTION

The present invention accordingly has an object to provide a method for forming a surface-release film of silicone on the surface of a substrate which exhibits releasability with full stability in the lapse of time. The invention is directed to a method for forming a surface-release film of silicone on the surface of a substrate which exhibits releasability with full stability in the lapse of time, in particular, when the silicone release composition is of the type utilizing the addition reaction between an organopolysiloxane having aliphatically unsaturated hydrocarbon groups, e.g., vinyl groups, bonded to the silicon atoms and an organohydrogenpolysiloxane having hydrogen atoms directly bonded to the silicon atoms in the presence of a platinum catalyst.

SUMMARY OF THE INVENTION

In the method aspect, the invention relates to the method for forming a surface-release film on the surface of a substrate comprising the successive steps of:

(A) coating the surface of the substrate with an organopolysiloxane composition comprising
  (a) an organopolysiloxane having, in a molecule, at least three aliphatically unsaturated hydrocarbon groups bonded to the silicon atoms,
  (b) an organohydrogenpolysiloxane having, in a molecule, at least three hydrogen atoms directly bonded to the silicon atoms, and
  (c) a platinum compound;
(B) curing the organopolysiloxane composition in the coating layer on the substrate surface; and
(C) coating the surface of the layer of the thus-cured organopolysiloxane composition with an organotin compound.

In a product aspect, this invention relates to a surface-release sheet which comprises, in successive layers:

(i) a substrate sheet;
(ii) an undercoating layer of a cured organopolysiloxane composition produced by curing an organopolysiloxane comprising:
  (a) an organopolysiloxane having, in a molecule, at least three aliphatically unsaturated hydrocarbon groups bonded to the silicon atoms,
  (b) an organohydrogenpolysiloxane having, in a molecule, at least three hydrogen atoms directly bonded to the silicon atoms, and
  (c) a platinum compound; and
(iii) an overcoating layer of an organotin compound.

DETAILED DESCRIPTION OF THE PREFERRED EMBODIMENTS

As is described above, the method of the invention essentially comprises three steps including (A) coating the substrate surface with a curable organopolysiloxane composition to form a coating layer of silicone, (B) curing the silicone in the coating layer and (C) coating the thus-cured coating layer of silicone with an organotin compound.

The curable organopolysiloxane composition used in step (A) above is a so-called addition-type composition comprising (a) an organopolysiloxane having, in a molecule, at least three aliphatically unsaturated hydrocarbon groups, e.g., vinyl groups, bonded to the silicon atoms, (b) an organohydrogenpolysiloxane having, in a molecule, at least three silicon-bonded hydrogen atoms, and (c) a platinum compound as a catalyst for promoting the addition reaction between the silicon-bonded vinyl groups in the component (a) and the silicon-bonded hydrogen atoms in the component (b).

The organopolysiloxane as the component (a) is represented by the average unit formula $$R^1_a R^2_b SiO_{(4-a-b)/2},$$

in which $R^1$ is an aliphatically unsaturated monovalent hydrocarbon group such as vinyl and allyl, preferably vinyl, groups; $R^2$ is a monovalent hydrocarbon group free from aliphatic unsaturation such as alkyl groups, e.g., methyl, ethyl, propyl and butyl, aryl groups, e.g., phenyl and tolyl groups, and cycloalkyl, e.g., cyclohexyl, as well as those substituted monovalent hydrocarbon groups obtained by replacing a part or all of the hydrogen atoms in the above-named hydrocarbon groups with halogen atoms, e.g., chloromethyl and 3,3,3-trifluoropropyl groups; and the subscripts a and b are each a positive number not exceeding 3 with the proviso that a+b is smaller than 4. It is preferable that at least 50% by moles of the groups denoted by $R^2$ in the molecule are methyl groups in order to obtain high releasability.

The component (b) is an organohydrogenpolysiloxane represented by the average unit formula $$R^3_c H_d SiO_{(4-c-d)/2},$$

in which $R^3$ is a monovalent hydrocarbon group which can be selected from the same class given above as examples of the group $R^2$ in component (a), the subscript c is zero or a positive number not exceeding 3 and the subscript d is a positive number smaller than 3 with the proviso that c+d is smaller than 4. The amount of the organohydrogenpolysiloxane as the component (b) in the curable organopolysiloxane composition should be sufficient to provide from 0.5 to 10 moles of the silicon-bonded hydrogen atoms per mole of the aliphatically unsaturated hydrocarbon groups in the component (a).

The platinum compound as the component (c) in the curable organopolysiloxane composition is a catalyst to promote the addition reaction or so-called hydrosilation reaction between the silicon-bonded aliphatically unsaturated, e.g., vinyl, groups in the component (a) and the silicon-bonded hydrogen atoms in the component (b). The platinum catalyst can be platinum in the elemental form such as platinum black and platinum supported on a carrier, such as silica and carbon black, but it is preferably a platinum compound such as chloroplatinic acid as such or chloroplatinic acid in the form of a solution in an alcohol or in the form of a complex with an olefin or a vinyl siloxane. The amount of the platinum catalyst as the component (c) is in the range from 5 to 500 ppm by weight as platinum based on the amount of the vinyl-containing organopolysiloxane as the component (a).

The curable organopolysiloxane composition used in step (A) of the inventive method can be prepared by uniformly blending the above-described components (a), (b) and (c), optionally, with an organic solvent. Substrates of varius kinds of materials, including paper, plastics and the like, can be easily coated with the thus-prepared curable organopolysiloxane composition by using a suitable coating machine such as a gravure coater, offset coater, wire doctor and the like. The coating amount of the coating composition is not particularly limitative but it is preferably in the range from 0.3 to 3 μm in thickness.

In step (B) of the inventive method, the curable organopolysiloxane composition in the coating layer on the substrate surface is cured. Though not particularly limitative, the curing treatment is performed by heating the coated substrate at a temperature in the range from 60° to 200° C. for a length of time in the range from 5 to 30 seconds.

In step (C) of the inventive method, the thus-cured coating layer of the organopolysiloxane composition is itself coated with an organotin compound. A suitable organotin compound is represented by the general formula $R_p SnA_{4-p}$, in which R is a monovalent hydrocarbon group free from aliphatic unsaturation exemplified by alkyl groups, e.g., methyl, ethyl, n-propyl, isopropyl, n-butyl, n-hexyl, 2-ethylhexyl and n-octyl, aryl groups, e.g., phenyl and tolyl, and cycloalkyl groups, e.g., cyclohexyl, as well as substituted hydrocarbon groups obtained by replacing a part or all of the hydrogen atoms in the above-named groups with halogen atoms and the like; A is an acyloxy group derived from, for example, a monobasic carboxylic acid, wuch as acetic acid, octoic acid, lauric acid and the like, or a dibasic carboxylic acid, such as maleic acid and the like; and the subscript p is 1, 2 or 3. Examples of suitable organotin compounds include dimethyl tin diacetate, dibutyl tin diacetate, dibutyl tin dioctoate, dibutyl tin dilaurate, dibutyl tin maleate, di-n-octyl tin diacetate, di-n-octyl tin dilaurate, di-n-octyl tin maleate, dibutyl tin di(monobutyl)maleate, dibutyl tin stearate phenylmaleate, di-n-octyl tin di(monobutyl)maleate and the like. These organotin compounds are used conveniently in the form of a solution prepared by dissolving the compound in a suitable organic solvent such as toluene and ethyl acetate.

Coating of the silicone-coated substrate with a solution of an organotin compound can be performed by any known method, including brush coating, spray coating, roller coating and wire-doctor coating, as well as immersion of the substrate in the solution followed by pulling up therefrom, without particular limitation. It is preferable in order to enhance the effect of coating with the organotin compound that the organotin compound on the substrate surface is freed from solvent as quickly as possible. Therefore the coating operation is performed at an elevated ambient temperature of 60° to 200° C. or after dipping in the solution, the substrate is rapidly dried by heating.

The coating amount of the organotin compound on the silicone-coated substrate surface is preferably in the range from 0.01 g to 5 g or, preferably, from 0.01 to 1.0 g or, more preferably, from 0.05 to 0.5 g per square meter of the surface. When the coating amount is too small, no improvement can be obtained in the surface-release stability. The desired improvement by coating with the organotin compound cannot be increased any further, on the other hand, even when the coating amount is increased over the above-mentioned upper limit with resulting economic disadvantage.

The method of the invention is described hereinafter in more detail by way of examples, in which the term of "parts" always refers to "parts by weight" and the viscosity values are all those obtained by the measurement at 25° C. In the following examples, the peeling resistance of the silicone release paper from the overlay paper was determined according to the following procedure of testing in three different conditions A, B and C of the test specimens relative to two lengths of time, one, from the preparation of the release paper to the bonding of the overlay paper and, the other, from the bonding of the overlay paper to peeling thereof as specified below.

Measurement of peeling resistance

The release paper as the test sample was coated with an acrylic resin-based solution-type pressure-sensitive adhesive (Oribine BPS-8170, a product by Toyo Ink Manufacturing Co.) in a coating amount of 30 g/m² as dried and dried by heating at 100° C. for 3 minutes followed by applying a sheet of overlay paper having a basis weight of 64 g/m² thereto which was bonded by pressing with a rubber roller of 2 kg weight moved once back and forth. After being kept standing at 25° C. for 24 hours or at 40° C. for 7 days, the overlay paper was peeled off using an automatic tensile tester in a pulling direction at an angle of 180° with a pulling velocity of 0.3 m/minute to determine the resistance against peeling.

Peeling resistance A: the silicone release paper was kept at 25° C. for 24 hours prior to bonding of the overlay paper and the peeling test was performed after 24 hours at 25° C. from bonding.

Peeling resistance B: the silicone release paper was kept at 40° C. for 7 days prior to bonding of the overlay paper and the peeling test was performed after 24 hours at 25° C. from bonding.

Peeling resistance C: the silicone release paper was kept at 25° C. for 24 hours prior to bonding of the overlay paper and the peeling test was performed after 7 days at 40° C. from bonding.

EXAMPLE 1

(Experiments Nos. 1-16)

Eight curable organopolysiloxane compositions, referred to as the Silicones I to VIII hereinbelow, were prepared each by uniformly blending 100 parts of a first vinyl-containing dimethylpolysiloxane having a viscosity of 500 centipoise of which the content of vinyl groups relative to all of the silicon-bonded organic groups was 1% by moles, referred to as the siloxane I hereinbelow, in Silicones I to IV or 30 parts of a second vinyl-containing divinyl polysiloxane of which the content of vinyl groups relative to all of the silicon-bonded organic groups was 1% by moles and a 30% by weight solution in toluene had a viscosity of 5200 centipoise, referred to as the siloxane II hereinbelow, in Silicones V to VIII, a methylhydrogenpolysiloxane having a viscosity of 180 centipoise, referred to as the H-siloxane hereinbelow, in an amount indicated in Table I below to give a molar ratio of the silicon-bonded hydrogen atoms in the H-siloxane to the silicon-bonded vinyl groups in the siloxane I or II (Si—H/Si—Vi) indicated in the table, chloroplatinic acid complexed with a vinyl siloxane so as to have a content of platinum of 1.0% by weight, in an amount of 2.0 ppm (Silicones I to IV) or 1.0 ppm (Silicones V to VIII) by weight as platinum and 0.4 part (Silicones I to IV) or 0.2 part (Silicones V to VIII) of 3-methyl-1-butyn-3-ol as a reaction moderator without (Silicones I to IV) or together with (Silicones V to VIII) 570 parts of toluene as a solvent.

TABLE 1

| Silicone | I | II | III | IV | V | VI | VII | VIII |
|---|---|---|---|---|---|---|---|---|
| H-siloxane, parts | 1.0 | 2.0 | 4.0 | 8.0 | 0.3 | 0.6 | 1.2 | 2.4 |
| Si-H/Si-Vi | 1.0 | 2.0 | 4.0 | 8.0 | 1.0 | 2.0 | 4.0 | 8.0 |

Sheets of polyethylene-laminated paper were uniformly coated each with one of the thus-prepared Silicones I to VIII in a coating amount of 0.8 g/m² calculated as the silicone content by using an offset coater (Silicones I to IV) or a wire doctor No. 14 (Silicones V to VIII) followed by heating to cure the silicone for 20 seconds in a hot-air circulation oven at 150° C. to form a cured film of the silicone on the surface.

In Experiments Nos. 1-8, the thus silicone-coated release papers were each further coated with a 1% by weight solution of dibutyl tin diacetate in toluene in a coating amount of 0.12 g/m² or in a coating thickness of 12 μm as dried followed by drying for 20 seconds in a hot-air circulation oven. These silicone release papers, after overcoating with the organotin compound, were subjected to the test of the peeling resistance in three ways of A, B and C as mentioned before. In Experiments Nos. 9-16 undertaken for comparative purposes, the test of peeling resistance was performed by omitting the coating step with the organotin compound. The results are shown in Table 2 below.

TABLE 2

| Experiment No. | Silicone No. | Peeling resistance, g/5 cm | | |
|---|---|---|---|---|
| | | A | B | C |
| 1 | I | 38 | 32 | 40 |
| 2 | II | 45 | 38 | 55 |
| 3 | III | 70 | 55 | 75 |
| 4 | IV | 90 | 70 | 105 |
| 5 | V | 35 | 30 | 38 |
| 6 | VI | 40 | 34 | 44 |
| 7 | VII | 65 | 50 | 70 |
| 8 | VIII | 80 | 65 | 90 |
| 9 | I | 52 | 34 | 70 |
| 10 | II | 85 | 55 | 90 |
| 11 | III | 220 | 120 | 310 |
| 12 | IV | 450 | 230 | 600 |
| 13 | V | 47 | 32 | 55 |
| 14 | VI | 75 | 50 | 90 |
| 15 | VII | 210 | 115 | 290 |
| 16 | VIII | 420 | 220 | 570 |

EXAMPLE 2

(Experiments Nos. 17-23)

The experimental procedure in each of these Experiments was substantially the same as in Experiment No. 2 described above, including the formulation of the curable organopolysiloxane composition, except that the dibutyl tin diacetate used in Experiment No. 2 was replaced with another dibutyl tin dicarboxylate indicated in Table 2 below with the same drying schedule as in Experiment No. 2 or the drying temperature after coating with the solution of the organotin compound was varied as indicated in the table using dibutyl tin diacetate as the organotin compound. The results of the measurements of the peeling resistance are shown in the table.

TABLE 3

| Experiment No. | Dibutyltin dicarboxylate | Drying temperature, °C. | Peeling resistance, g/5 cm | | |
|---|---|---|---|---|---|
| | | | A | B | C |
| 17 | Dioctoate | 120 | 48 | 40 | 58 |

TABLE 3-continued

| Experiment No. | Dibutyltin dicarboxylate | Drying temperature, °C. | Peeling resistance, g/5 cm | | |
| --- | --- | --- | --- | --- | --- |
| | | | A | B | C |
| 18 | Dilaurate | 120 | 46 | 40 | 60 |
| 19 | Maleate | 120 | 50 | 42 | 60 |
| 20 | Diacetate | 80 | 60 | 50 | 70 |
| 21 | Diacetate | 100 | 38 | 35 | 42 |
| 22 | Maleate | 140 | 35 | 32 | 37 |
| 23 | Diacetate | 160 | 34 | 32 | 36 |

EXAMPLE 3

(Experiments Nos. 24–28)

The experimental procedure in each of these Experiments was substantially the same as in Experiment No. 2, except that the coating amount of dibutyl tin diacetate as the organotin compound was varied, as indicated in Table 4 below, by increasing the concentration of the compound in the toluene solution to 5% and 10% by weight or by decreasing the concentration to 0.1%, 0.05% and 0.01%. The results of the test of peeling resistance are shown in the same table.

TABLE 4

| Experiment No. | Coating amount, g/m² | Peeling resistance, g/5 cm | | |
| --- | --- | --- | --- | --- |
| | | A | B | C |
| 24 | 1.2 | 42 | 37 | 47 |
| 25 | 0.6 | 44 | 38 | 50 |
| 26 | 0.012 | 49 | 40 | 60 |
| 27 | 0.006 | 84 | 54 | 90 |
| 28 | 0.0012 | 85 | 53 | 92 |

What is claimed is:

1. A surface-release sheet which comprises, in successive layers:
   (i) a substrate sheet;
   (ii) an undercoating layer of a thickness of about 0.3 to 3 μm of a cured organopolysiloxane composition produced by curing a curable organopolysiloxane composition comprising:
      (a) an organopolysiloxane having, in a molecule, at least three aliphatically unsaturated hydrocarbon groups bonded to the silicon atoms,
      (b) an organohydrogenpolysiloxane having, in a molecule, at least three hydrogen atoms directly bonded to the silicon atoms, and
      (c) a platinum compound; and
   (iii) an overcoating layer containing from 0.01 g to 5 g per square meter of substrate surface area of an organotin compound of the general formula $R_pSnA_{4-p}$, in which R is a monovalent hydrocarbon group free from aliphatic unsaturation, the subscript p is the integer 1, 2, or 3, and A is an acyloxy group.

2. The surface-release sheet as claimed in claim 1 wherein the substrate sheet is paper or a plastic film.

3. The surface-release sheet as claimed in claim 1 wherein the overcoating layer contains about 0.05 g to 0.5 g of the organotin compound per square meter of substrate surface area.

4. The surface-release sheet as claimed in claim 1 wherein the organotin compound is selected from the class consisting of dibutyl tin diacetate, dibutyl tin dioctoate, dibutyl tin dilaurate, dibutyl tin maleate, dioctyl tin diacetate, dioctyl tin dilaurate and dioctyl tin maleate.

5. A surface-release sheet as claimed in claim 1, wherein the substrate sheet is paper or a plastic film; and wherein the overcoating layer contains about 0.05 g to 0.5 g of the organotin compound per square meter of substrate surface area.

6. A surface-release sheet as claimed in claim 1, wherein the organotin compound is dibutyl tin diacetate.

7. A surface-release sheet as claimed in claim 3, wherein the organotin compound is dibutyl tin diacetate and wherein the overcoating layer contains about 0.01 g to 0.5 g of the organotin compound per square meter of substrate surface area.

8. A surface-release sheet as claimed in claim 7, wherein the organotin compound is dibutyl tin diacetate and which comprises an overcoating layer containing about 0.01 g to 0.5 g of the organotin compound per square meter of substrate surface area.

9. A surface-release sheet as claimed in claim 1, wherein the substrate sheet is polyethylene-laminated paper.

10. A surface-release sheet as claimed in claim 1, which comprises, as a further successive layer, (iv) an overlay paper.

11. A surface-release sheet as claimed in claim 5, which comprises, as a further successive layer, (iv) an overlay paper.

12. A surface-release sheet as claimed in claim 7, wherein the substrate sheet is polyethylene-laminated paper.

* * * * *